United States Patent Office 3,556,609
Patented Jan. 19, 1971

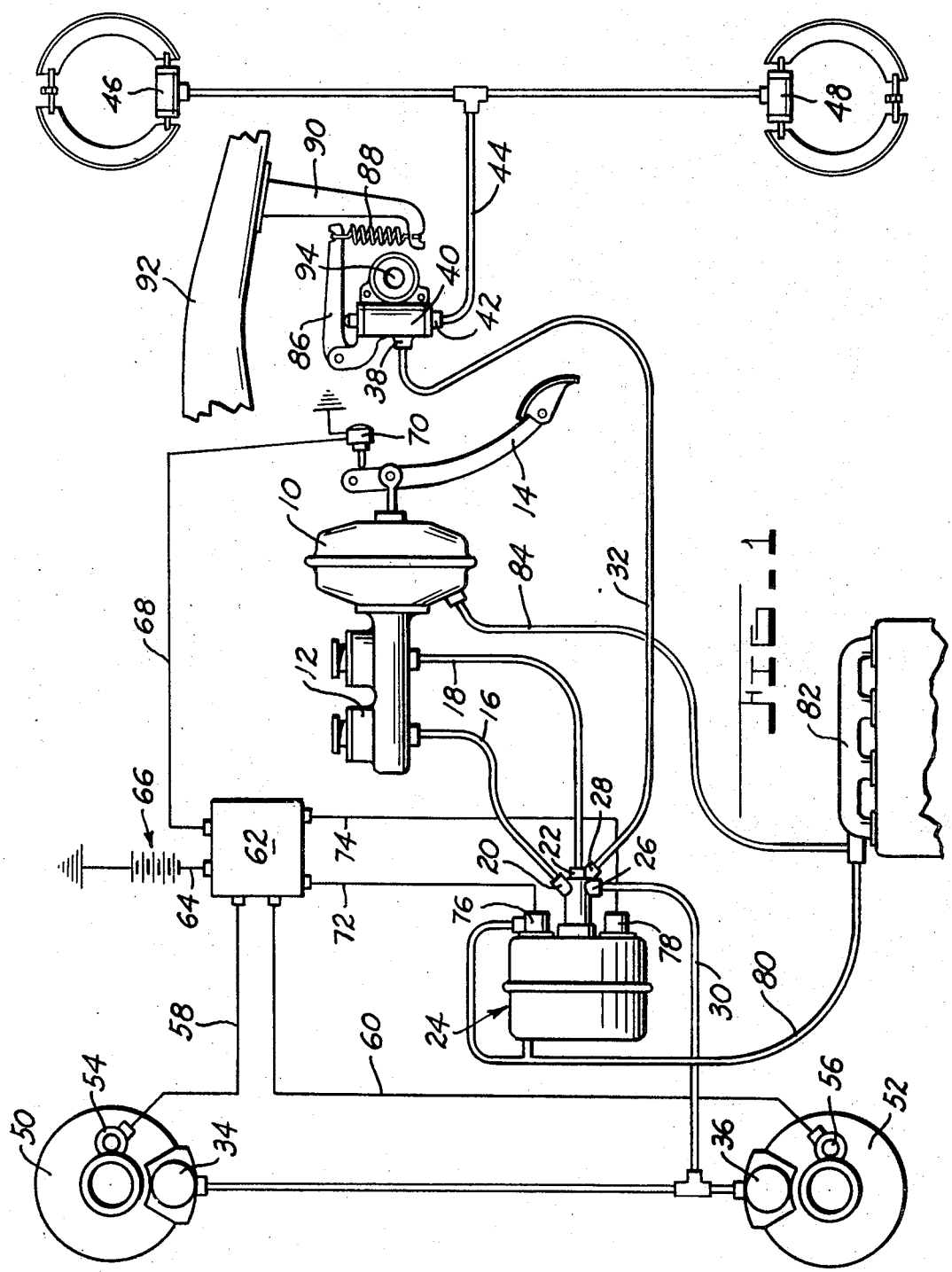

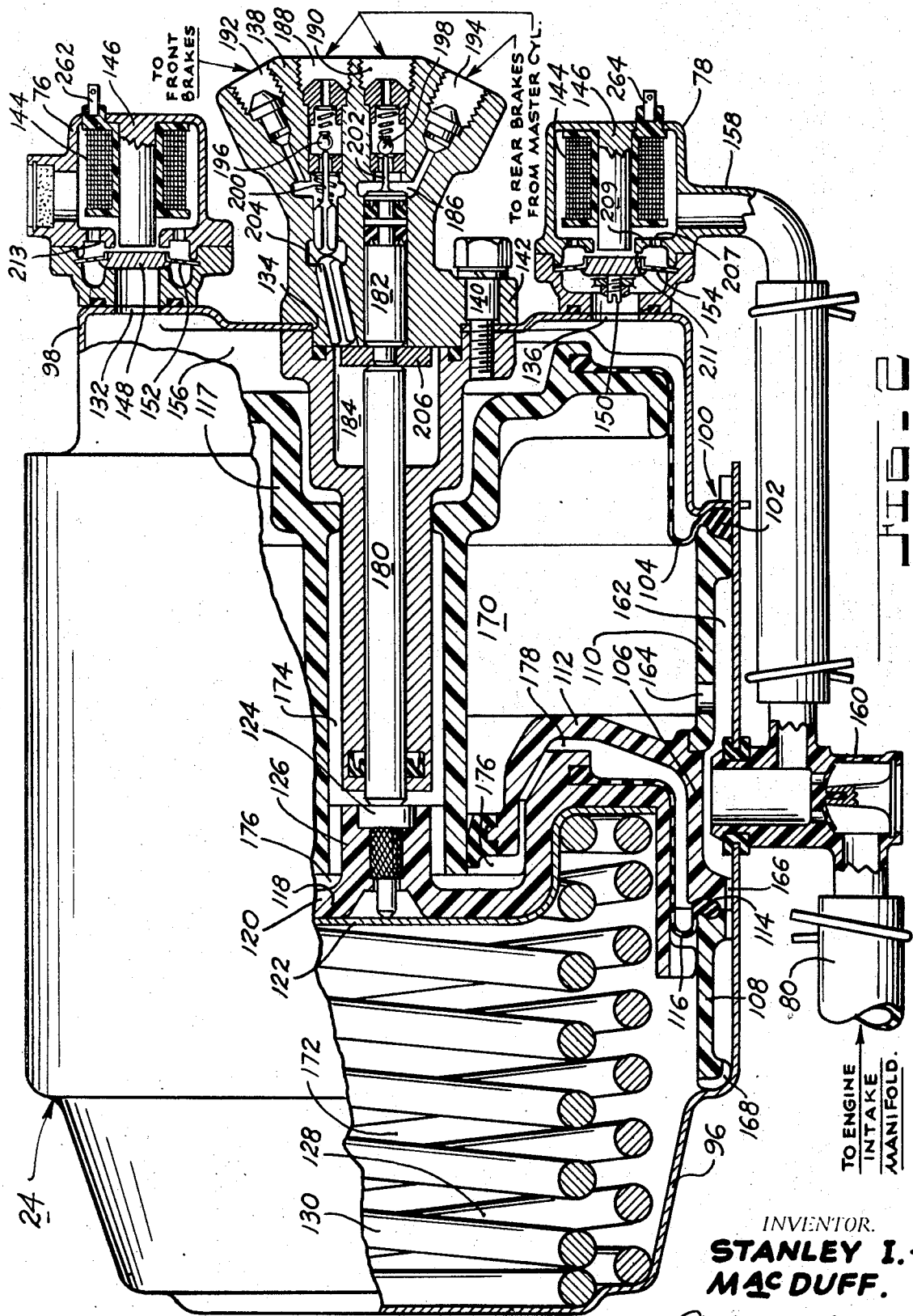

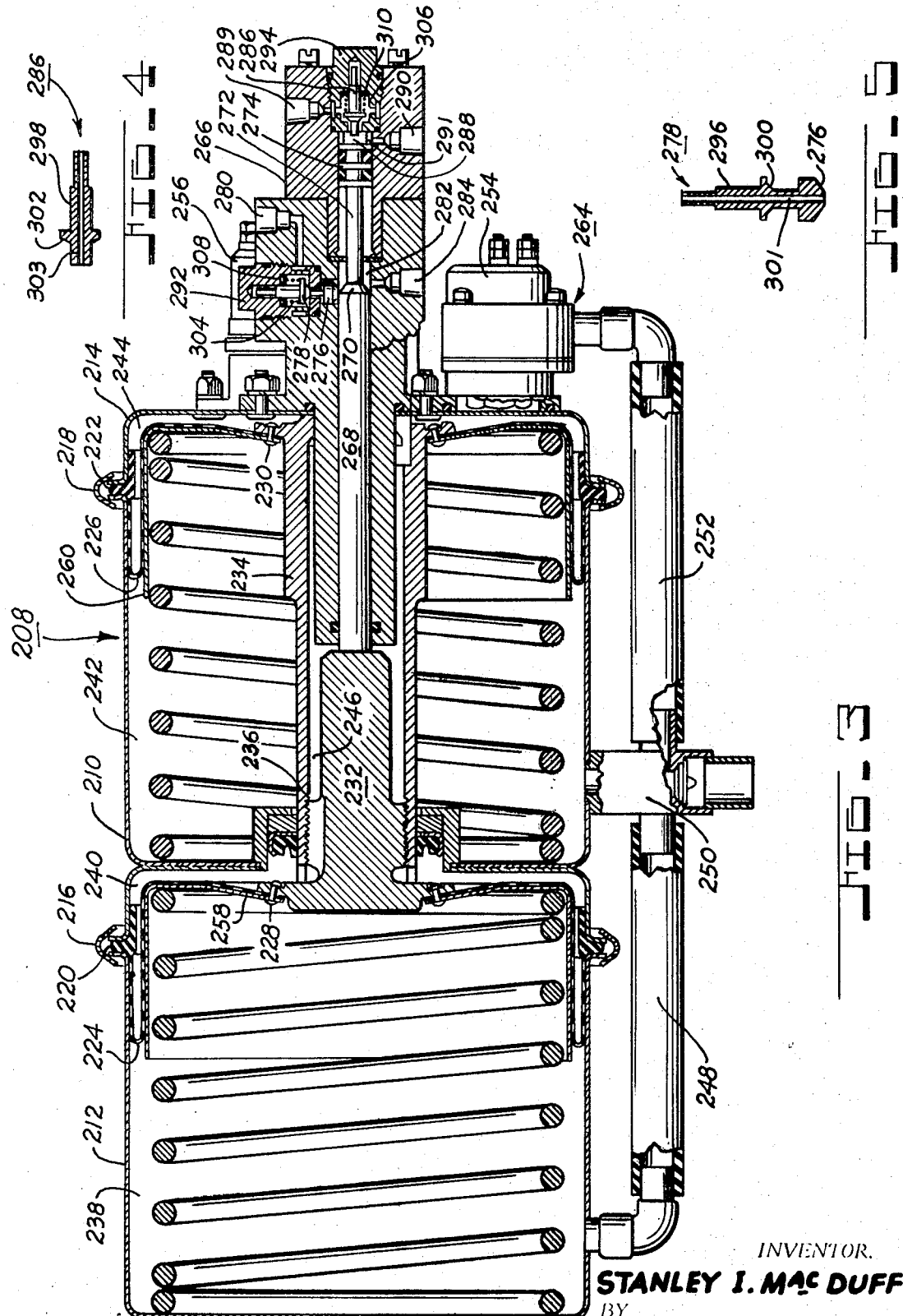

3,556,609
HYDRAULIC PRESSURE MODULATOR
Stanley I. MacDuff, South Bend, Ind., assignor to The Bendix Corporation, a corporation of Delaware
Filed Sept. 30, 1968, Ser. No. 763,742
Int. Cl. B60t 8/12
U.S. Cl. 303—21
11 Claims

ABSTRACT OF THE DISCLOSURE

An anti-skid braking system which includes a modulator for controlling communication between the master cylinder and the brakes. The modulator allows normal communication until a skid condition is sensed. Upon sensing the skid condition, the modulator releases fluid pressure from the brakes until the skid condition no longer exists and, thereafter, reapplies the fluid pressure to the brakes. This cycle is repeated as many times as the skid condition is sensed.

SUMMARY

Pressure modulators which have the ability to control communication between hydraulic actuators and motors and automatically terminate the same to thereby take over the operation of the motors are generally well known in the art, as exemplified in U.S. Pats. Nos. 3,093,422 and 3,325,226. However, such modulators have not taken into account the control of tandem hydraulic actuation devices for tandem motors that are separated for fail-safe objectives. For example, the present day vehicle braking systems are required by Federal Law to provide for separate brake control systems on the front and rear axles of the vehicle. In these applications modulators such as have been suggested in the prior art would be counter to the Federal Law in that they are only able to modulate a single hydraulic pressure from a single actuator to a single motor. Therefore, the principal object of this invention is to provide a modulator which can meet the braking systems required today by the Federal standards.

It is another object of this invention to improve upon the prior art type of modulators by adding fail-safe provisions to the servomotor section of the modulator.

A still further object of this invention is to provide a hydraulic pressure modulator with balanced inlet valves that eliminate the effect of pressure created by the hydraulic actuator upon their functioning in the modulator.

DRAWING DESCRIPTION

Other objects and advantages will most certainly appear to those skilled in the art to which this invention relates from a detailed reading of the description of the drawings in which:

FIG. 1 shows a schematic braking system for a vehicle which provides a utilization for a modulator in accordance with the principles of this invention;

FIG. 2 is a partial cross sectional view of a modulator as schematically illustrated in FIG. 1 for installation in a hydraulic pressure system;

FIG. 3 is a cross sectional view of still another form that the modulator may take and be within the principles set forth by this invention; and FIGS. 4 and 5 are cross sectional views of balanced valves controlling brake system hydraulic pressure communication via the modulator of FIG. 3.

DETAILED DESCRIPTION

At the outset it should be appreciated that while the invention has been more particularly directed to a modulator for use in a vehicle braking system, that there are several other adaptations for such a modulator as proposed by this invention. In particular, it is visualized that in an industrial application utilizing hydraulic pressure for controlling tooling, or the like, there is need for a modulator such as this invention discloses for controlling the operation of such tooling regardless of the operator's commanding hydraulic actuator after a certain hydraulic pressure has been developed in a press, for example.

In any event the present invention finds particular adaptation, as mentioned previously, in a vehicle braking system, as an anti-skid control element therein.

Vehicle design for the current decade or more has involved the assembly of a brake system with components that are designed to match an average condition of operation for a vehicle. More particularly, it has been previously thought that if one designed the wheel cylinders of the brake system of the vehicle in order to accommodate a reasonably loaded vehicle on a dry pavement that the average conditions of operation of a vehicle would be met and they would be reasonably safe for operation on the highways throughout the world. As the number of vehicles in operation increases with each succeeding year, it has been observed that the reasonable conditions heretofore thought available for design purposes are not the most practical today, or for that matter, tomorrow. Therefore, it is the intent of the braking industry to provide a brake system which will readily adapt itself to the conditions of operation for the vehicle to optimize the braking on the vehicle wheels in all conditions of operation. Thus, the present day intent of the vehicle industry and the brake suppliers is to provide an anti-skid device for the vehicle at a reasonable cost. Such a system is illustrated in FIG. 1, as could be made available to today's vehicles as well as tomorrow's. It involves the use of the fluid pressure servomotor 10 controlling a tandem or split master cylinder 12 which is operated by a brake pedal 14 within the operator's compartment of a vehicle. The master cylinder 12 is connected by means of conduits 16 and 18 to inlets 20 and 22 of a modulator 24 which also is provided with outlets 26 and 28 to which conduits 30 and 32 are connected leading to front disc brake actuators 34 and 36 and an inlet port 38 of the rear brake load proportioning valve 40 that has an outlet port 42. With regard to the load proportioning valve 40, its outlet port 42 has connected to it a conduit 44 leading to wheel cylinders 46 and 48 of the vehicle's rear brake system, shown as drum brakes in this instance. The vehicle's front brakes have braking discs 50 and 52 to which deceleration sensors 54 and 56 are operatively connected to provide a signal corresponding to the wheel deceleration. This signal is communicated by means of electrical leads 58 and 60 to a computer control center 62 which is connected by an electrical lead 64 to the vehicle's battery 66 and to a source of ground via electrical lead 68 and switch 70 that is activated upon the depression of the brake pedal 14. The logic provided by the computer 62 is communicated via electrical leads 72 and 74 to solenoid valves 76 and 78 of the servomotor 24. The system is completed upon the attaching of vacuum conduit 80 from the vehicle's engine intake manifold 82 and conduit 84 also therefrom to the modulator 24 and servomotor 10, respectively. It should be noted that the brake proportioning valve includes a lever 86 connected by a spring 88 to a bracket 90 attached to the vehicle frame 92 so as to regulate delivery of hydraulic pressure through valve 40 in accordance with the distance separating the frame 92 from a rear axle 94 of the vehicle mounting the rear brakes containing wheel cylinders 46 and 48 and also the load proportioning valve 40.

With particular regard now to FIG. 2, the modulator 24 is more clearly depicted to involve a housing having a front shell 96 and a rear shell 98 joined, as by a twist lock assembly 100 with a peripheral bead 102 of a diaphragm 104 interposed for sealing the juncture of the shells. Within the shell a partition having a central portion 106 with axially projecting front and rear portions 108 and 110 joined thereto is provided to make sure of the compression of the bead 102 and allow for the tolerance of construction of the shells 96 and 98. The central portion 106 of the partition has a dividing wall 112, and the juncture of portion 106 with portion 108 is sealed by means of peripheral bead 114 of the diaphragm 116.

Within the chamber formed by the juncture of shells 96 and 98 movable walls 117 and 118 are sealingly related to diaphragms 104 and 116, respectively, and operatively connected to each other in the structure of FIG. 2 by an abutment as at 120. The walls 116 and 118 may be reinforced, as by means of a metal plate 122 on the wall 118 and by means of a button 124 within boss 126 of wall 118 that also contacts the plate 122, as shown. A pair of springs 128 and 130 are installed within the front shell 96 so that upon the assembly of the shells 96 and 98 they are both compressed between the wall 118 and the end of the shell 96. If desired, one spring could be used for this positioning of the walls 118 and 116 in their rest attitude as shown by FIG. 2. However, for the purposes of fail-safe construction the invention concerns itself with the utilization of two springs in order that if one should happen to break during the life of the modulator the other will be sufficient to perform the modulator functions.

Shell 98 is provided with openings 132, 134 and 136 on its rearwardmost face to which the solenoid valve 76, a hydraulic cylinder 138 and the solenoid valve 78 are connected such as by flanges thereon and bolts as illustrated by bolt 140 on flange 142 for the cylinder 138.

Within each of the solenoid valves 76 and 78 there is provided a coil 144 and a core 146 for controlling poppets 148 and 150 that are suspended in the valves 76 and 78 by slotted spring fingers 152 and 154; and the housing structure of the valves 76 and 78 is arranged in cooperation with the slotted spring fingers 152 and 154 to maintain poppet 148 normally closing the passageway through valve 76 to a control chamber 156 of modulator 24 and to keep poppet 150 normally open whereby communication from a conduit 158 is open around the slotted fingers 154 to the chamber 156. As seen, conduit 158 is connected to check valve structure 160 which is communicated to conduit 80 leading from the vehicle engine intake manifold 82 (see FIG. 1) so that vacuum is always present within the conduit 158 and into an annular chamber 162 about the partition constructed from members 106, 108 and 110. In this regard it should be noted that member 110 is provided with a plurality of radial openings 164 and that notches 166 and 168 are provided at the juncture of elements 106 and 108 and at the end of element 108, respectively, to communnicate chamber 162 to chambers 170 and 172 on similar sides of walls 116 and 118, respectively. Likewise, chamber 156 is communicated, via passage 174 internally of the wall 116 to the notches 176 on the forward face of wall 118, to a chamber 178 on a similar side of wall 118, whereby chambers 156 and 178 are on opposite sides of the walls than the chambers 170 and 172.

Cylinder 138 is bored for the receipt of plungers 180 and 182 which plungers create chambers 184 and 186 in the bore of the cylinder 138. To each of these chambers 184 and 186 separate inlets 188 and 190 as well as separate outlets 192 and 194 are communicated in the housing for cylinder 138. In the inlets 188 and 190 spring biased ball valves 196 and 198 are operatively related to pins 200 and 202, the former of which is connected by link 204 to plate 206 on plunger 180 and the latter of which is connected to or abutting on plunger 182. The pin 200 and its link 204 have fluted bodies in order to permit fluid communication between the chamber 184 and outlet 192 as well as from inlet 188 to chamber 184 and/or outlet 192.

Solenoid valve 78 has orifices 207 provided in the peripheral regions of its wall 209 having valve seat 211 as does wall 213 for valve 76.

With regard now to FIG. 3 there is shown a modified modulator 208 that can be substituted for the modulator 24 in FIG. 1. This modulator involves the use of an intermediate shell 210 with rear shell 212 and a front shell 214 that are joined, all together, by a band clamp 216 and 218 with peripheral walls 220 and 222 of rolling diaphragms 224 and 226 interposed to seal the joint. Diaphragms 224 and 226 are affixed by means of threadless fasteners 228 and 230 to hub structures 232 and 234 that are threadedly joined together as at 126 to provide variable volume chambers 238, 240, 242 and 244 within the servomotor section of modulator 208. As with the modulator 24, the communication of control chambers 240 and 244 is via internal passage 246 of the hubs 232 and 234. In contrast to the modulator 24 the communication of chambers 238 and 242 is via an external conduit 248 connected to vacuum check valve 250 to which also conduit 252 is communicated leading to solenoid valve 254 which, in addition to solenoid valve 256 controls the response of the movable walls in the modulator 208. Diaphragm 222 and 224 have diaphragm support plates 258 and 260 also held by threadless fasteners 228 and 230 to the hubs 232 and 234. The solenoids for valves 254 and 256 (comprising coils 144 and cores 146 as in FIG. 2) are connected by means of electric terminals 262 and 264 to electrical leads 74 and 72, respectively.

The modulator 208 of FIG. 3 has a modified hydraulic cylinder housing 266 wherein a hydraulic plunger 268 is provided with a chamfer 270 and a projection 272 abutting a floating piston 274 forming the other portion of the plunger means for the cylinder 266. The chamfer 270 cooperates with a cam face 276 of a balanced valve 278 controlling communication of inlet 280 with a chamber 282 open by means of an outlet port 284. A similar balanced valve 286 cooperates with the notched head 288 of floating piston 274 for controlling an inlet port 289 communicating with chamber 291 and outlet port 290. The balanced valves 278 and 286 are assembled by means of plugs 292 and 294 into appropriate openings in the cylinder housing 266. When it is said that valves 278 and 286 are balanced valves, it is meant that the valve stem portion 296 and 298 is equal in diameter to the seating area of valve heads 300 and 302 and each of the valves are provided with longitudinal through passages 301 and 303 so that hydraulic pressure on all surfaces of the valve is balanced and only forces of valve springs 304 and 306 enter into the control of the valves.

It should be noted that lip seals 308 and 310 seal the stems 296 and 298 about their receiving bore of plugs 292 and 294 such that pressure in chambers 282 and 291 can, in the event of being higher than pressures at ports 280 and 289, bleed by the seals to relieve the pressures in chambers 282 and 291. In this way positive release of hydraulic pressure in the brake system disclosed can be assured by the seals which prevent leak down so long as brake pressure is demanded.

OPERATION

In operation the vehicle operator upon depressing brake pedal 14 will close contacts in switch 70 to energize the computer control center 62. In addition he will provide hydraulic pressure via conduits 16 and 18 to the inlets 20 and 22 (ports 188 and 190 of the modular 24 shown in FIG. 2) which will initially be exhausted via chambers 184 and 186 to the outlets 26 and 28 (ports 192 and 194), respectively, to conduits 30 and 32 leading to the front disc brake actuators 34 and 36 and the load proportioning valve 40 respectively. Initially, also, this brake pressure in conduit 32 will be communicated through the load proportioning valve 40 via conduit 44 to wheel cylinders 46 and 48 for actuation of the rear brakes of the vehicle. In the event of a load shift, which can be expected to occur soon thereafter, the communication of conduit 34 to wheel cylinders 46 and 48 will be gradually modulated by valve 40 because of the effect of the load shaft on the distance between the frame 92 and the axle 94.

Either prior to this deceleration causing a load shift or after it, sensors 54 and 56 may sense a corresponding deceleration of brake discs 50 and 52 which tell the computer center 62 to create logic signals in leads 72 and 74 to first of all close poppet 150 by the electromagnetic attraction of core 146 upon energization of coil 144 of the poppet 150 towards the seat of the housing for valve 78. This will, upon seating of poppet 150, terminate the communication of vacuum in conduit 158 to chambers 156 and, via passage 174, notches 176, chamber 178. If the computer control center 62 further requires that the rapid rate of deceleration be retarded, valve 76 will be energized so that the electromagnetic action of core 146, caused by energization of coil 144, will pull poppet 148 off its seat to communicate atmospheric air into chamber 156 and via passage 174 notches 176 to chamber 178. Thus a pressure differential will be created across walls 116 and 118 to move these walls in opposition to the force of springs 128 and 130. This will withdraw plunger 180 whose withdrawal will be followed up by means of floating piston 182 but to a lesser extent in view of the fact that piston 182 has not only the pressure of chamber 186 acting on it but also the pressure chamber 184. This first permits closure of valves 196 and 198 terminating communication of master cylinder 12 with chambers 184 and 186. Further movement of plunger 180 increases the displacement for the front and rear braking system beyond the modulator 24 and will thereby lessen the rate of retardation until the sensors 54 and 56 tell the computer control center 62 to curtail the operation of modulator 24.

After the desired displacement increase in reference to signals from computer control 62, the solenoid valves 76 and 78 will both be closed; i.e., blocking opening 132 and on seat 211, respectively. However, as spring fingers 154 have openings allowing communication of vacuum in conduit 158 via openings 207 to chambers 156 and 178, there will be a gradual expansion of springs 128 and 130 to slowly build brake pressure from ports 192 and 194 until sensors 54 and/or 56 again sense wheel lock and control 62 responds, as before. These passages 207 are to be small, and, thus the opening of poppet 148 to communicate atmospheric pressure to opening 132 will not be affected by them.

Upon release of the vehicle brakes 14, switch 70 is opened to deactivate the computer control center 62 and the walls 116 and 118 are again suspended in vacuum whereby springs 128 and 130 will return plunger means 180, 182 to the rest position and brake fluid from the brake system is returned to the reservoirs for the split master cylinder 12; i.e., plunger 180 and floating piston 182 open valves 196 and 198. The system is now ready for reapplication. Lip seals 308 and 310 shown in the structure of FIG. 3 aid in eliminating delay in the establishment of return flow to provide a faster response and return to normal.

Having fully described an operative construction of at least two embodiments visualized so far for my invention, it is now desired to set forth the intended claims for these Letters Patent as follows.

I claim:
1. A hydraulic brake system comprising:
a fluid pressure actuating means;
a motor to be actuated by said means;
a brake pressure modulator between said means and said motor, said modulator including:
a fluid pressure servomotor having a housing and a hydraulic cylinder connected thereto with a movable wall biased by a spring in said housing operatively connected to a plunger means in said cylinder creating first and second variable volume chambers therein with said plunger means having one portion thereof exposed to both said chambers,
first and second valve means controlled by said plunger means between separate fluid inlets and outlets to said chambers, and
solenoid valve means for said servomotor to control a pressure differential for said movable wall to assist said plunger means in overcoming said spring and regulating the connection of said fluid actuating means to said motor via said modulator and upon interrupting same control fluid displacement in the brake system between said motor and said modulator to regulate braking while permitting gradual decrease in displacement when lapped; and
electrical means to control said solenoid valve means.
2. An anti-skid system for a vehicle comprising:
a fluid source;
a vehicle wheel brake actuating means that delivers separate fluid pressures including operator-operated means for same;
a brake means including separated brake motors for said separate fluid pressures;
modulator means between said actuating means and said brake means in the fluid communication therebetween, said modulator means having separate fluid chambers with separate fluid inlets and outlets with check valves in said inlets under control of operatively connected, and relatively movable, plungers whose position is controlled by a spring biased wall controlled by valve means and the separate fluid pressures in said separate fluid chambers to normally maintain fluid communication between the actuating means and said brake means and be operable to terminate such communication and thereafter alternately relieve and apply separated fluid pressure to said brake means independent of said actuating means and regardless thereof until the operator-operated means is released; and
means responsive to said brake means controlling said valve means.
3. The structure of claim 2 wherein said plungers consist of one element operatively connected to the movable wall and another element operatively connected to the one element to be floating in a cylinder common to both such that said another element is exposed to fluid pressure of the separate fluid chambers on opposite faces.
4. The structure of claim 3 wherein the one element controls via mechanical linkage one check valve for one inlet of one chamber and the another element controls another check valve via mechanical linkage in another inlet for another chamber.
5. The structure of claim 2 wherein there is a load sensitive brake proportioning means between the brake means and the modulator means in at least one of the separated systems.
6. An anti-skid system for a vehicle comprising:
a fluid source;
a vehicle wheel brake actuating means that delivers separate fluid pressures including operator-operated means for same;
a brake means including separated brake motors for said separate fluid pressures;
modulator means between said actuating means and said brake means in the fluid communication therebetween, said modulator means having separate fluid chambers with separate fluid inlets and outlets with check valves in said inlets under control of operatively connected and relatively movable plungers whose position is controlled by a spring biased wall controlled by valve means and the separate fluid pressures in said separate fluid chambers to normally maintain fluid communication between the actuating means and said brake means and be operable to terminate such communication and thereafter alternately relieve and apply separated fluid pressure to said brake means independent of said actuating means and regardless thereof until the operator-operated means is released; and means responsive to said brake means controlling said valve means;

said spring biased wall including first and second diaphragm supported pistons in a housing on opposite sides of a partition therein with said pistons having passage means for communicating chambers on similar sides of said pistons and said partition having passage means communicating similar chambers on opposite sides of said pistons as respects those chambers communicated within said pistons.

7. wheeled vehicle with anti-skid system comprising:

actuating means for supplying separate fluid pressures upon application of said actuating means by an operator of said vehicle;

brake means for restricting the rotation velocity of the wheels of said vehicle, said brake means having separated brake motors for said separate fluid pressures;

modulation means in fluid communication between said actuating means and said brake means, said modulation means having separate fluid chambers with separate fluid inlets and outlets with check valves in said inlets under control of operatively connected and relatively movable plungers whose position is controlled by a spring biased wall, said spring biased wall being controlled by valve means and the separate fluid pressures in said separate fluid chambers to normally maintain fluid communication between said actuating means and said brake means and, upon operation of said valve means, to alternately relieve and apply said separate fluid pressures to said separated brake motors independent of said application by the operation;

control means for operating said valve means; and sensor means for providing signals to said control means which represent rotational speed of the wheels.

8. A wheeled vehicle with anti-skid system, as recited in claim 7, wherein said signals from said sensor means represent the speed of two wheels of said vehicle, said control means operating said valve means when either of said two wheels begins a skid condition.

9. The structure of claim 8 wherein said first and second pistons are abuttingly connected and a fail-safe spring means is compressed between a housing for said wall and one of said first and second pistons.

10. The structure of claim 9 wherein said first and second pistons are joined in the housing and first and second springs are interposed between the housing and one of said pistons and the partition and the other of said pistons.

11. A wheeled vehicle with anti-skid system, as recited in claim 7, wherein said signals from said sensor means represent the speed of two wheels of said vehicle, said control means operating said valve means when both of said two wheels begin a skid condition.

References Cited

UNITED STATES PATENTS

| | | | |
|---|---|---|---|
| 3,093,422 | 6/1963 | Packer et al. | 303—21 |
| 3,264,040 | 8/1966 | Brueder | 303—21 |
| 3,415,577 | 12/1968 | Walker | 303—21 |
| 3,442,557 | 5/1969 | Oberthur | 303—22 |

MILTON BUCHLER, Primary Examiner

JOHN J. McLAUGHLIN, Jr., Assistant Examiner

U.S. Cl. X.R.

188—181; 303—6, 22